US009456135B2

(12) United States Patent
Sugiyama et al.

(10) Patent No.: US 9,456,135 B2
(45) Date of Patent: *Sep. 27, 2016

(54) IMAGE SYNTHESIZING APPARATUS, IMAGE SYNTHESIZING METHOD, AND IMAGE SYNTHESIZING PROGRAM

(71) Applicant: Sony Corporation, Tokyo (JP)

(72) Inventors: Masatoshi Sugiyama, Tokyo (JP); Toru Shiono, Tokyo (JP); Shinichi Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 14/165,795

(22) Filed: Jan. 28, 2014

(65) Prior Publication Data

US 2014/0139622 A1    May 22, 2014

Related U.S. Application Data

(63) Continuation of application No. 13/411,662, filed on Mar. 5, 2012, now Pat. No. 8,682,104.

(30) Foreign Application Priority Data

Mar. 11, 2011  (JP) ................. 2011-054033

(51) Int. Cl.
G06K 9/36 (2006.01)
H04N 7/00 (2011.01)
H04N 5/232 (2006.01)
H04N 1/387 (2006.01)
H04N 5/222 (2006.01)
H04N 5/369 (2011.01)

(Continued)

(52) U.S. Cl.
CPC ........ *H04N 5/23238* (2013.01); *H04N 1/3876* (2013.01); *H04N 5/2226* (2013.01); *H04N 5/3696* (2013.01); *G06K 9/00221* (2013.01); *G06T 1/0007* (2013.01); *G06T 2207/20221* (2013.01); *G06T 2207/30201* (2013.01)

(58) Field of Classification Search
CPC ............. H04N 1/3876; H04N 5/2226; H04N 5/23238; H04N 5/3696; G06T 2207/20221; G06T 2207/30201; G06T 1/0007; G06K 9/00221
USPC .................................. 382/284, 312; 348/36
See application file for complete search history.

(56) References Cited

U.S. PATENT DOCUMENTS 6,577,821 B2   6/2003  Desormeaux
6,778,771 B2   8/2004  Nonaka
7,221,395 B2   5/2007  Kinjo
(Continued)

FOREIGN PATENT DOCUMENTS

JP   11-196316 A    7/1999
JP   2005-333396 A  12/2005
(Continued)

*Primary Examiner* — Kanjibhai Patel
(74) *Attorney, Agent, or Firm* — Chip Law Group

(57) ABSTRACT

An image synthesizing apparatus includes a subject region determination unit that determines a region of a nearby subject for each of taken images based on subject distance information of a plurality of points generated by distance measurement made during imaging and an image synthesizing unit that creates a synthetic image by cutting out an image from each of the taken images based on a position of the region of the nearby subject and combining the cut images of the taken images.

22 Claims, 11 Drawing Sheets

(51) Int. Cl.
*G06T 1/00* (2006.01)
*G06K 9/00* (2006.01)

(56) References Cited

U.S. PATENT DOCUMENTS

| | | |
|---|---|---|
| 8,102,406 B2 | 1/2012 | Peleg et al. |
| 8,125,541 B2 | 2/2012 | Koyama et al. |
| 8,228,419 B2 | 7/2012 | Hong et al. |
| 8,331,725 B2 | 12/2012 | Forutanpour |
| 8,494,051 B2 | 7/2013 | Li et al. |
| 2009/0102987 A1* | 4/2009 | Kojima .......................... 348/744 |
| 2009/0256858 A1 | 10/2009 | Ogikubo et al. |
| 2010/0238325 A1* | 9/2010 | Hoshino et al. ............... 348/239 |
| 2011/0193941 A1* | 8/2011 | Inaba et al. ..................... 348/46 |
| 2012/0230606 A1 | 9/2012 | Sugiyama et al. |

FOREIGN PATENT DOCUMENTS

| | | |
|---|---|---|
| JP | 2008-092005 A | 4/2008 |
| JP | 2009-268037 A | 11/2009 |
| JP | 2010-169709 A | 8/2010 |
| JP | 2010-268052 A | 11/2010 |

\* cited by examiner

| 28 | 28 | 99 | 99 | 99 | 99 | 99 |
|----|----|----|----|----|----|----|
| 28 | 30 | 99 | 99 | 99 | 99 | 99 |
| 28 | 29 | 99 | 76 | 76 | 80 | 30 |
| 28 | 28 | 47 | 77 | 77 | 72 | 28 |
| 25 | 28 | 45 | 57 | 72 | 28 | 28 |
| 25 | 25 | 35 | 34 | 35 | 28 | 25 |
| 10 | 10 | 10 | 10 | 10 | 10 | 10 |

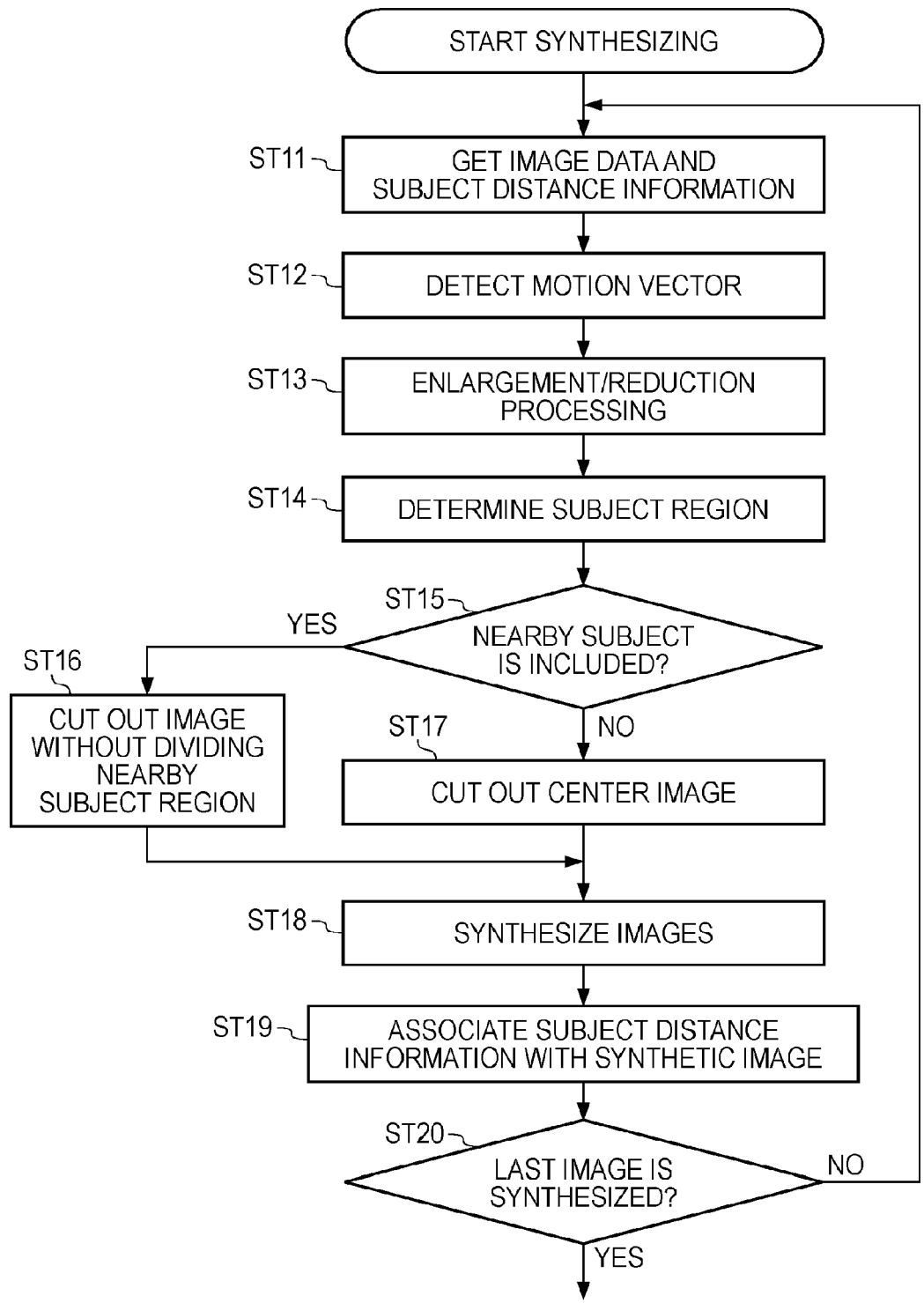

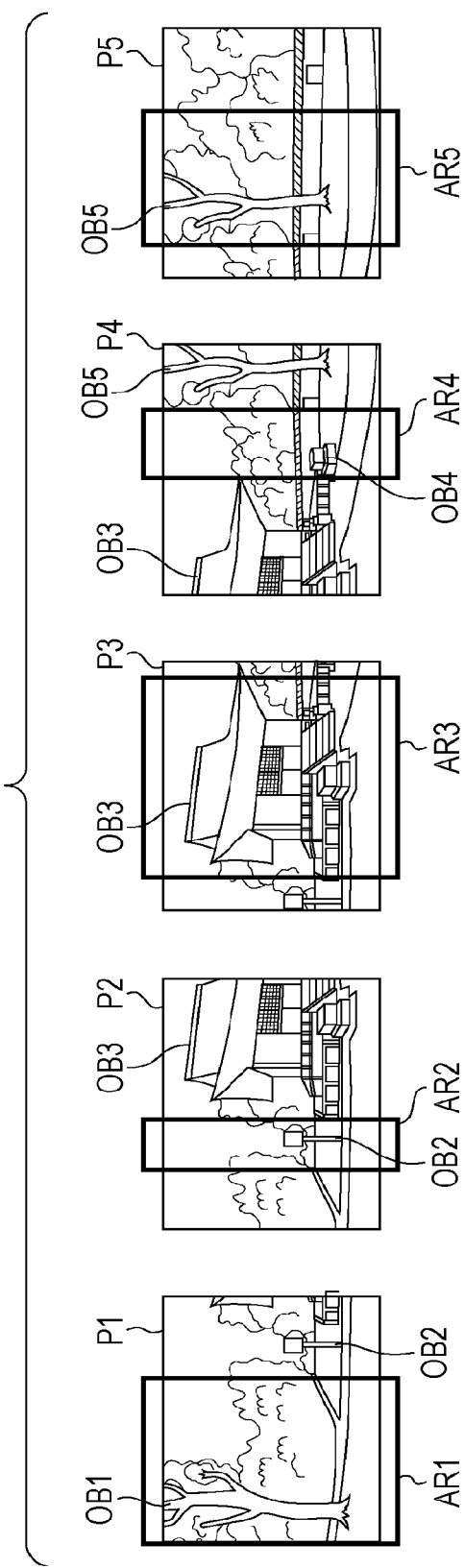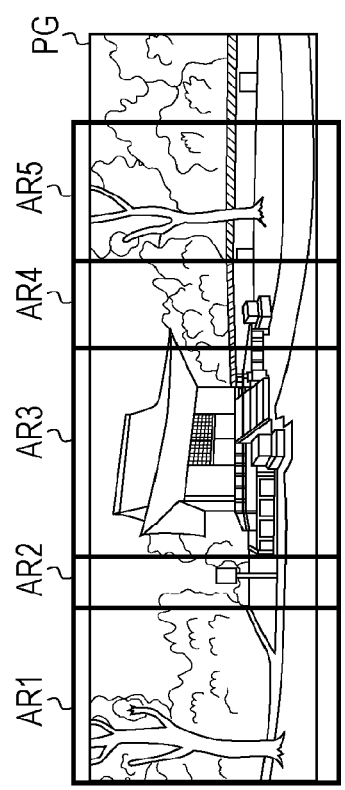

FIG. 11A
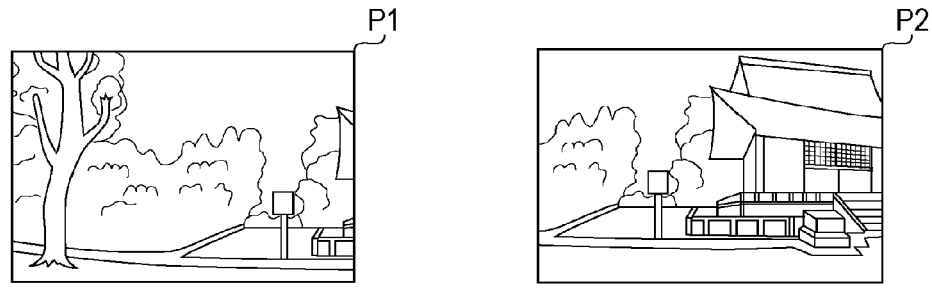
FIG. 11B
| 28 | 28 | 99 | 99 | 99 | 99 | 99 |
|---|---|---|---|---|---|---|
| 28 | 30 | 99 | 99 | 99 | 99 | 99 |
| 28 | 29 | 99 | 76 | 76 | 99 | 43 |
| 28 | 28 | 47 | 77 | 77 | 99 | 72 |
| 25 | 28 | 45 | 57 | 72 | 28 | 72 |
| 25 | 25 | 35 | 34 | 35 | 28 | 34 |
| 10 | 10 | 10 | 10 | 10 | 10 | 10 |
DLa
| 99 | 99 | 99 | 99 | 99 | 60 | 60 |
|---|---|---|---|---|---|---|
| 75 | 75 | 99 | 42 | 45 | 40 | 47 |
| 76 | 76 | 99 | 71 | 36 | 32 | 36 |
| 56 | 71 | 27 | 71 | 25 | 26 | 27 |
| 34 | 34 | 27 | 34 | 18 | 18 | 17 |
| 9 | 9 | 9 | 9 | 9 | 9 | 9 |
| 8 | 8 | 8 | 8 | 8 | 8 | 8 |
DLb
FIG. 11C
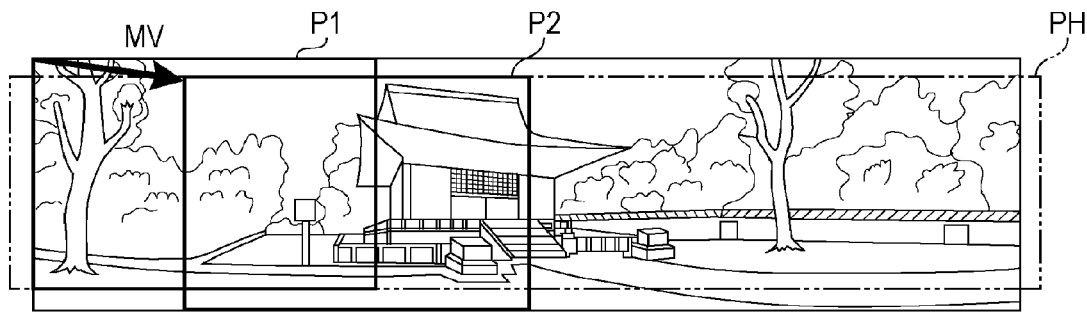

IMAGE SYNTHESIZING APPARATUS, IMAGE SYNTHESIZING METHOD, AND IMAGE SYNTHESIZING PROGRAM

This is a continuation of U.S. patent application Ser. No. 13/411,662, filed Mar. 5, 2012. This application also claims the benefit of Japanese Patent Application Number 2011-054033, filed Mar. 11, 2011. The entire content of each of the foregoing applications is incorporated herein by reference.

BACKGROUND

The present technology relates to an image synthesizing apparatus, image synthesizing method, and image synthesizing program. More particularly, the present technology facilitates the creation of a high quality synthetic image with a wide angle of view by controlling image synthesis.

There is a related-art technique for synthesizing taken images obtained through a plurality of imaging operations while swinging or parallel moving of an imaging apparatus to create a panoramic image with a wider angle of view than an image obtained through one imaging operation. For example, Japanese Unexamined Patent Application Publication No. 11-282100 creates a panoramic image by extracting characteristic points of images and combines the images so that the characteristic points are aligned with each other.

When images are combined so that their characteristic points are aligned with each other, a seam may appear on a main subject because a seam between images is determined regardless of the intention of the user. Accordingly, in Japanese Unexamined Patent Application Publication No. 2008-176430 (corresponding US Publication: US2008-015962), if a seam for image synthesis appears in a position specified by the user, the seam can be overwritten by the user-selected image.

SUMMARY

When a seam of the panoramic image is overwritten by the user-selected image, the automatic creation of a panoramic image with no seam for image synthesis in the position specified by the user is not performed since the overwriting image should be selected. In addition, when a plurality of images are synthesized automatically, high quality synthesis is not easy.

It is desirable to provide an image synthesizing apparatus, image synthesizing method, and image synthesizing program that facilitate the creation of a high quality synthetic image with a wide angle of view by controlling the synthesis of a plurality of images when the images are combined to create the synthetic image.

According to an embodiment of the present technology, there is provided an image synthesizing apparatus including a subject region determination unit that determines the region of a nearby subject for each of taken images based on subject distance information of a plurality of points generated by distance measurement during imaging and an image synthesizing unit that creates a synthetic image by cutting out an image from each of the taken images based on a position of the region of the nearby subject and combining the cut image for each of the taken images.

In this technology, the subject distance information at a plurality of points generated by distance measurement during imaging is compared with a preset threshold and, based on the comparison result, the region of the nearby subject is determined. When the region of the nearby subject has been determined, the image is cut out so that the region of the nearby subject is not divided. When the region of the nearby subject has not been determined, the image at the center is cut out. When the region of the nearby subject is redundantly present in taken images, the image in the region of the nearby subject is cut out from the taken image located closer to the center in the direction in which the images are combined so as to be consecutive to create a synthetic image. The correlation of subject distance information is detected and a duplicate region in taken images is estimated on the basis of the detection result. According to the difference of subject distance information in the estimated duplicate region, the image is enlarged or reduced. In addition, the movement vector between two consecutive images is detected on the basis of subject distance information and the images cut out from the enlarged or reduced image are combined on the basis of the position and movement vector of the region of the nearby subject to create a synthetic image.

According to another embodiment of the present technology, there is provided an image synthesizing method including determining a region of a nearby subject for each of taken images based on subject distance information of a plurality of points generated by distance measurement made during imaging and creating a synthetic image by cutting out images from each of taken images based on a position of the region of the nearby subject and combining the cut images to create a synthetic image.

According to still another embodiment of the present technology, there is provided a program letting a computer execute a process for image synthesis creating a synthetic image with a wide angle of view from a plurality of taken images, the process including determining a region of a nearby subject in a taken image based on subject distance information of a plurality of points generated by distance measurement made during imaging, cutting out an image from the taken image based on a position of the region of the nearby subject, and combining the image for each of the taken images to create a synthetic image.

The computer program according to an embodiment of the present technology can be provided, in a computer-readable form, for a general purpose computer system that can execute various program codes, through a storage medium such as an optical disc, magnetic disc, or semiconductor memory or a communication medium such as a network. Providing this type of program in a computer-readable form enables the computer system to perform processing according to the program.

According to an embodiment of the present technology, based on subject distance information of a plurality of points generated by distance measurement during imaging, the region of the nearby subject in a taken picture is determined. Images are cut out from the taken image based on the position of the region of the nearby subject and the images that were cut out are combined to create a synthetic image. Accordingly, it is not necessary to select an image that overwrites a seam or to overwrite the seam with the selected image and an image is cut out on the basis of the position of the region of the nearby subject and then synthesized, so a high quality synthesis image with a wide angle of view can be easily created.

BRIEF DESCRIPTION OF THE DRAWINGS

FIG. 9 is a flowchart showing the creation of a synthetic image.

FIGS. 10A and 10B illustrate the creation of a synthetic image.

FIGS. 11A to 11C show a motion vector and enlargement and reduction processing.

DETAILED DESCRIPTION OF EMBODIMENTS

Embodiments of the present technology will be described below in the following order.
1. Structure of imaging apparatus including image processing device
2. Operation of imaging apparatus including image processing device <1. Structure of Imaging Apparatus Including Image Processing Device>

Figure 1:
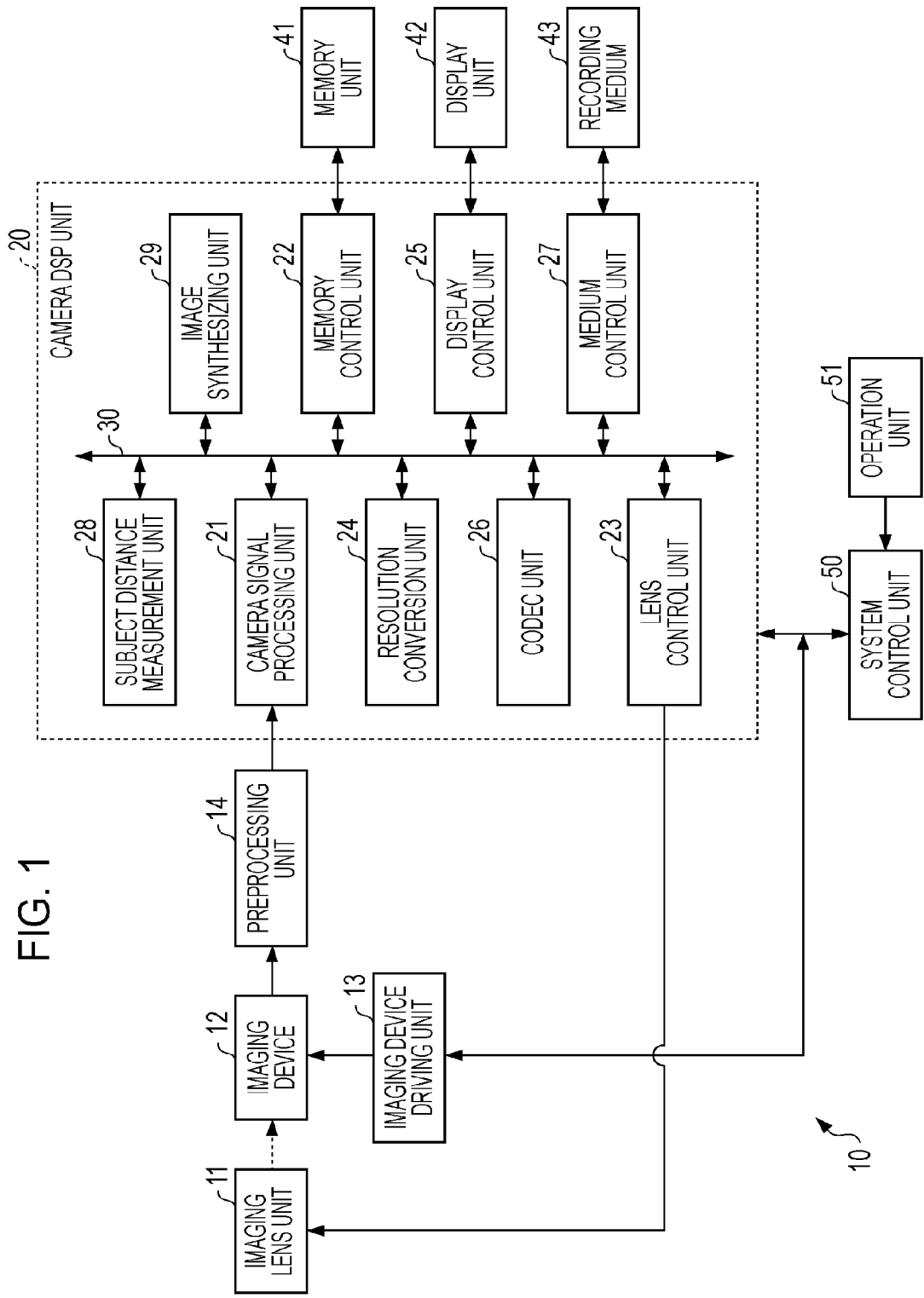
FIG. 1 shows the structure of an imaging apparatus.

FIG. 1 illustrates the structure of an imaging apparatus 10 including an imaging processing device in an embodiment of the present technology. The imaging apparatus 10 includes an imaging lens unit 11, an imaging device 12, an imaging device driving unit 13, a preprocessing unit 14, a camera DSP unit 20, a memory unit 41, a display unit 42, a recording medium 43, a system control unit 50, and an operation unit 51.

The imaging lens unit 11 functions as an imaging optical system that introduces subject light to the imaging device 12. The imaging lens unit 11 includes a focus lens, which adjusts the focal point of an optical image focused on an imaging surface on the imaging device 12, a zoom lens, which changes the scale of an optical image, etc.

The imaging device 12 includes CMOS (complementary metal-oxide semiconductor), CCD (charge coupled device), or other solid-state imaging devices. The imaging device 12 generates an imaging signal corresponding to an optical image focused on the acceptance surface by the imaging lens unit 11 and outputs the imaging signal to the preprocessing unit 14.

The imaging device driving unit 13 generates a driving signal and supplies it to the imaging device 12 to let the imaging device 12 generate and output the imaging signal.

The preprocessing unit 14 applies correlated double sampling (CDS), analog amplification, or A/D conversion to the imaging signal supplied from the imaging device 12, generates image data, and outputs the image data to the camera DSP (digital signal processing) unit 20.

The camera DSP unit 20 records or replays image data output from the preprocessing unit 5, performs processing related to image display based on the image data, a synthesis image with a wide view of angle, etc., under the control of the system control unit 50 described later. The camera DSP unit 20 is connected to the memory unit 41, which is used for a work area by the camera DSP unit 20 for various processes.

The camera DSP unit 20 includes a camera signal processing unit 21, a memory control unit 22, a lens control unit 23, a resolution conversion unit 24, a display control unit 25, a codec unit 26, a medium control unit 27, a subject distance measurement unit 28, and an image synthesizing unit 29. The individual components of the camera DSP unit 20 are connected via an internal bus 30.

The camera signal processing unit 21 makes a white balance adjustment, gamma correction, etc. on image data supplied from the preprocessing unit 14. The camera signal processing unit 21 detects information used for aperture correction and auto focus adjustment from image data and outputs the detected information to the lens control unit 23.

The memory control unit 22 controls the writing of data to the memory unit 41 and the reading of the written data from the memory unit 41. The memory control unit 22 writes image data and coded data supplied from the individual components of the camera DSP unit 20 to the memory unit 41, or reads image data and coded data written to the memory unit 41 and outputs the data to the individual components of the camera DSP unit 20.

The lens control unit 23 drives the imaging lens unit 11 based on information obtained from the camera signal processing unit 21 or a control signal from the system control unit 50 described later to perform auto focus control, zoom control, aperture control, etc.

The resolution conversion unit 24 converts the resolution of image data stored in the memory unit 41 or image data output from the camera signal processing unit 21. For example, the resolution conversion unit 24 converts image data to which camera signal processing was applied to image data corresponding to the display resolution of the display unit 42. Alternatively, the resolution conversion unit 24 converts image data to the resolution specified by the user so that it can be recorded in the recording medium 43. The resolution conversion unit 24 also cuts out a part of a taken image and performs processing related to this resolution conversion to generate image data to which electronic zoom or reproduction zoom has been applied.

The display control unit 25 drives the display unit 42 using image data supplied from the resolution conversion unit 24 or image data stored in the memory unit 41 to display a monitor image during imaging operation, an image recorded in the memory unit 41, and an image stored in the recording medium 43. The display control unit 25 also lets the display unit 42 display a menu for selecting functions to be installed in the imaging apparatus 10 or the state of settings of the imaging apparatus 10.

The codec unit 26 compresses image data and outputs the obtained coded data to the memory control unit 22 or the medium control unit 27 to record the coded data in the memory unit 41 or the recording medium 43. The codec unit 26 also performs the data decompression of coded data read from the memory unit 41 or the recording medium 43 and outputs the obtained image data to the memory control unit 22, the display control unit 25, etc. In this data compression or decompression, the method using JPEG (joint photographic coding experts group) is applied. In motion pictures, data compression methods using motion vectors such as MPEG1 (motion picture experts group 1), MPEG2 (motion picture experts group 2), MPEG4 (motion picture experts group 4) of ISO/IEC JTC1/SC29WG11, and H.263 or H.264/MPEG4-AVC (advanced video coding) of ITU-T, etc. are used.

The memory control unit 22 controls the writing of data to the memory unit 41 and the reading of written data. The memory control unit 22 writes image data or coded data provided from the components of the camera DSP unit 20 to the memory unit 41 or reads image data or coded data written in the memory unit 41 and outputs the image data or coded data to the individual components of the camera DSP unit 20.

The medium control unit 27 controls the writing of data to the recording medium 43 and the reading of data written in the recording medium 43. The medium control unit 27 writes image data or coded data provided from the individual components of the camera DSP unit 20 to the recording medium 43 or reads image data or coded data written in the recording medium 43 and outputs the image data or coded data to the individual components of the camera DSP unit 20.

The subject distance measurement unit 28 measures the distance to the subject at a plurality of points within the imaging area during imaging and generates distance information (referred to below as subject distance information) corresponding to the measurement result. The subject distance measurement unit 28 outputs the generated subject distance information to the image synthesizing unit 29. Alternatively, the subject distance measurement unit 28 associates the generated subject distance information with the image data of the taken image and supplies it to the memory unit 41 or recording medium 43.

Figure 2:
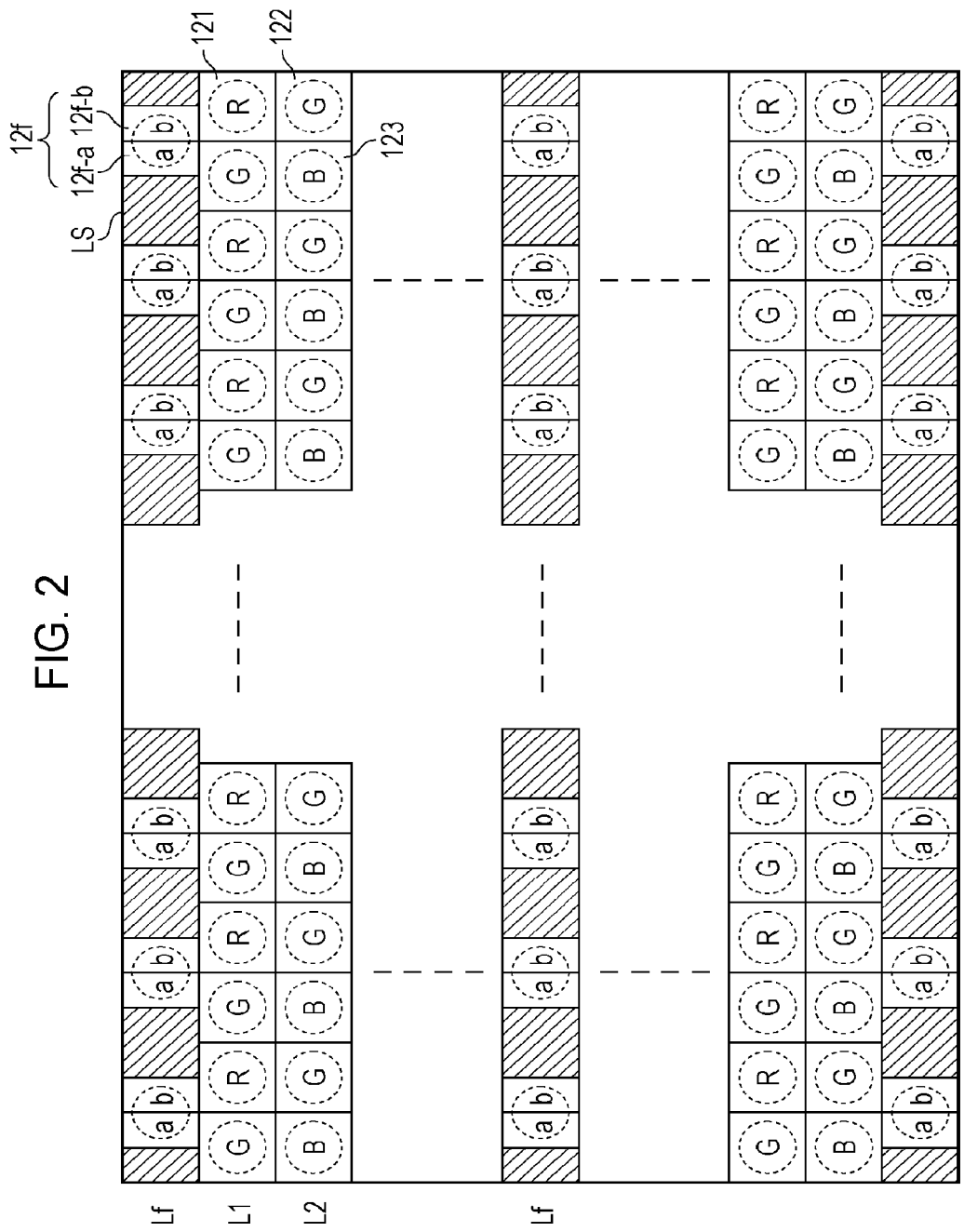
FIG. 2 shows the structure of a CMOS solid-state imaging device with phase contrast pixels.

A CMOS solid-state image sensing device with phase contrast pixels for detecting the focal point by pupil division of subject light can be used as the subject distance measurement unit 28, as shown in Japanese Unexamined Patent Application Publication No. 2010-169709. FIG. 2 shows the structure of a CMOS solid-state imaging device with phase contrast pixels. The imaging device 12 has a matrix of a plurality of pixels including photodiodes, arranged two-dimensionally. For example, red (R), green (G), and blue (B) color filters, each having a different spectral characteristic, are arranged on the acceptance surface of each pixel at a ratio of 1 to 2 to 1 to form R pixels 121, G pixels 122, and B pixels 123. In addition, a phase contrast pixel pair (referred to below as an AF (auto focus) pixel pair) **12*f* for detecting the focal point by pupil division of subject light is disposed. A dotted line indicated by R pixels 121, G pixels 122, and B pixels 123, and AF pixel pair 12*f*** represents a macro lens that functions as a focusing lens.

In the pixels with no pupil division function, G pixels 122 and R pixels 121 are arranged alternately in the horizontal direction to form a horizontal line L1, and B pixels 123 and G pixels 122 are arranged alternately in the horizontal direction to form a horizontal line L2. The horizontal line L1 and the horizontal line L2 are arranged alternately in the vertical direction to form a Bayer pattern.

The AF pixel pair **12*f* is arranged repeatedly in the horizontal direction to form an AF line Lf. The shaded areas are light shield sections LS. A plurality of AF lines Lf created as described above are disposed at intervals of a predetermined number of lines in the vertical direction. The photoreception data obtained by a first AF pixel 12*f*-a of the AF pixel pair 12*f* is assumed to be A series data and the photoreception data obtained by a second AF pixel 12*f*-b** is assumed to be B series data.

Figure 3:
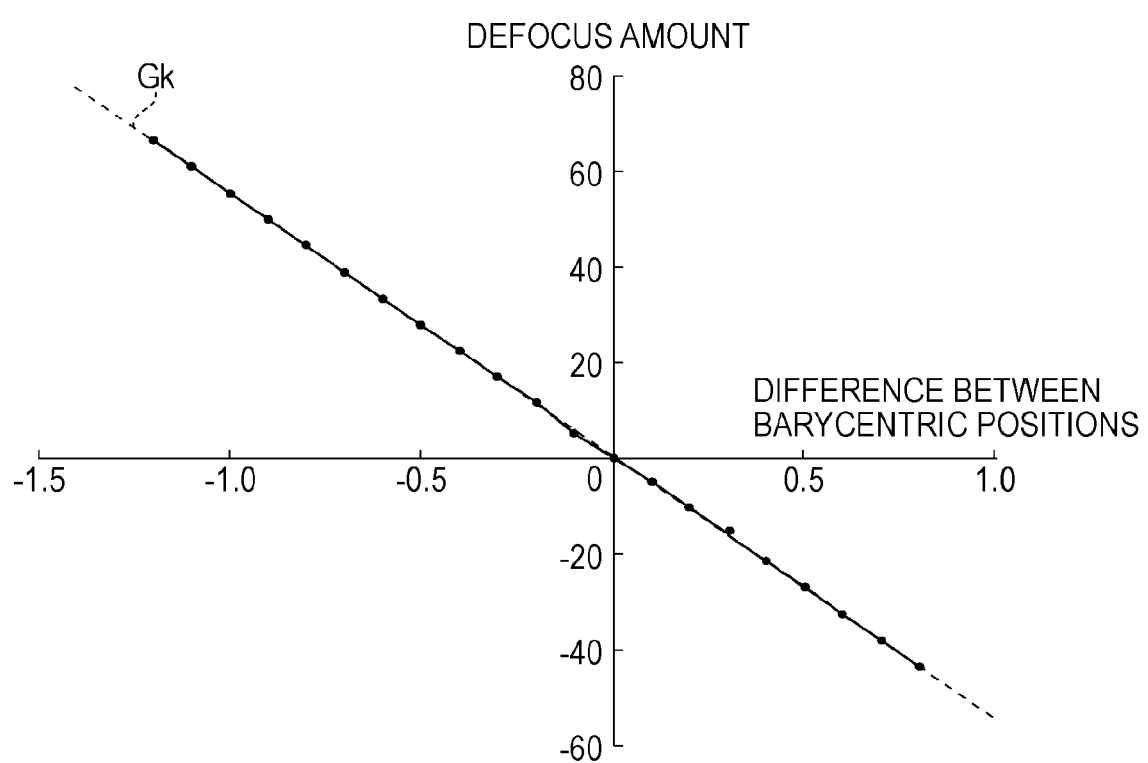
FIG. 3 shows the relationship between the shift amount and defocus amount caused between an A series image and a B series image.

If an A series image is compared with a B series image, as a defocus amount increases, a shift amount (displacement amount) in the AF line Lf direction (horizontal direction) caused between the A series image and the B series image increases. FIG. 3 illustrates the relationship between the shift amount and defocus amount caused between the A series image and the B series image. In FIG. 3, the horizontal axis represents the difference (pixel pitch) between the barycentric position of the A series image and the barycentric position of the B series image and the vertical axis represents a defocus amount (μm). Barycentric position Xg of each image is obtained from expression (1). In expression (1), $X_1$ to $X_n$ represent, for example, pixel positions beginning with the left end on AF line Lf and $Y_1$ to $Y_n$ represent output values from the first AF pixel **12*f*-a and the second AF pixel 12*f*-b** at the positions $X_1$ to $X_n$.

$$Xg = \frac{X_1 Y_1 + X_2 Y_2 + \ldots + X_n Y_n}{Y_1 + Y_2 + \ldots + Y_n} \qquad (1)$$

As shown in FIG. 3, the relationship between the defocus amount (μm) and the difference (pitch) between the barycentric positions of a pair of images is proportional. This relationship is represented by expression (2) where the defocus amount is DF (μm) and the difference between the barycentric positions is C (μm). Coefficient k in expression (2) represents gradient Gk (indicated by a dotted line in FIG. 3), which can be obtained in advance by a factory test etc.

$$DF = k \times C \qquad (2)$$

As described above, the difference (phase contrast) C between the barycentric positions in the A series data and B series data obtained from the AF pixel pair **12*f* of the AF line Lf is calculated and then expression (2) is calculated to obtain the defocus amount DF. On the basis of the defocus amount DF calculated in this way, the distance to the subject is calculated. Since the AF pixel pairs 12*f*** are dispersed on the imaging surface, the distance to the subject can be measured at a plurality of points within the imaging range.

The subject distance measurement unit 28 does not have to use a CMOS solid-state imaging device with phase contrast pixels as long as it can generate subject distance information that depends on the distance to the subject at a plurality of points within the imaging range. For example, the subject distance measurement unit 28 may generate subject distance information by determining the distance to the subject based on a sensor signal from a range sensor that uses infrared light or silent sound.

In FIG. 1, the image synthesizing unit 29 synthesizes taken images using image data read from the camera signal processing unit 21 or the memory unit 41 or image data read supplied from the coded unit 26 and generates the image data of the synthetic image. In image synthesis, the image synthesizing unit 29 determines the region of the nearby subject based on subject distance information at a plurality of points, cuts out images from the taken image based on the position of the region of the nearby subject, and combines the images that were cut out.

Figure 4:
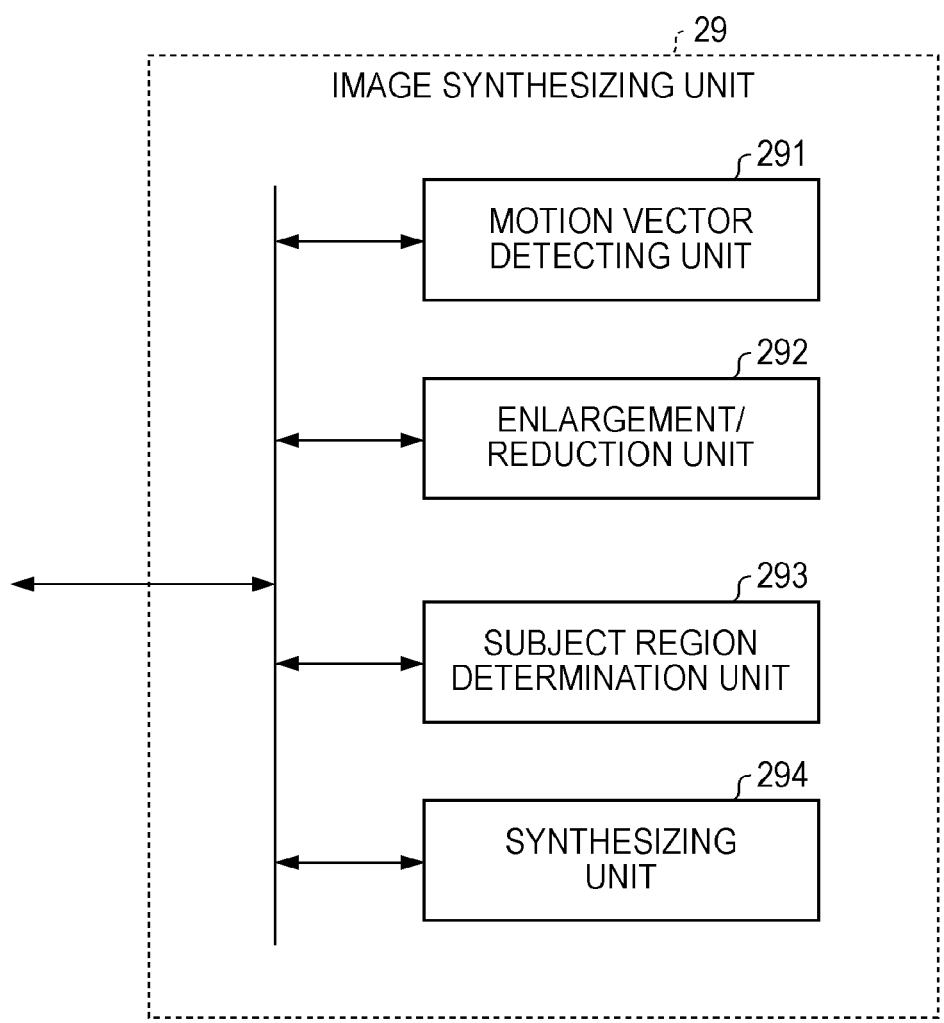
FIG. 4 shows the structure of an image synthesizing unit.

FIG. 4 shows the structure of the image synthesizing unit 29. The image synthesizing unit 29 includes a motion vector detecting unit 291, an enlargement/reduction unit 292, a subject region determination unit 293, and a synthesizing unit 294.

The motion vector detecting unit 291 detects the motion vector between two consecutive taken images based on the correlation of subject distance information. The enlargement/reduction unit 292 enlarges or reduces images based on subject distance information of the duplicate part in two consecutive taken images to make the size of the same subject identical in the consecutive images. The enlargement/reduction unit 292 also corrects subject distance information according to the enlarged or reduced images.

The subject region determination unit 293 determines the region of the nearby subject based on subject distance information. The subject region determination unit 293 compares a preset threshold with subject distance information and determines the coordinates at which the subject distance information is smaller than the threshold as the region of the nearby subject.

The synthesizing unit 294 cuts out images based on the result of the detection of the subject region, adjusts their positions based on the motion vector detecting unit 291, and synthesizes the images to create a consecutive synthetic image at its seam. When the nearby subject is indicated as a result of the detection of the subject region, the synthesizing unit 294 cuts out an image so that the seam of the image is not located on the nearby subject. When the nearby subject is not indicated as a result of the detection of the subject region, the synthesizing unit 294 cuts out the image at the center, which is less affected by image distortion caused by the imaging lens unit 11 etc. For example, the image in the region of the nearby subject is cut out from the taken image located closer to the center in the direction in which the images are combined. In addition, the image may be cut out so that the subject is redundantly present at the seam to enable images to be blended at the seam based on the result of detection of the subject region and the motion vector. Alternatively, the image may be cut out so that one image switches to the other image at the seam so that the subject at the seam becomes continuous. The synthesizing unit 294 combines the cut out images in sequence to form a synthetic image with a wide angle of view, or a panoramic image.

The synthesizing unit 294 determines whether the region of the nearby subject is redundantly present in more than one taken image based on subject distance information. When the region of the nearby subject is redundantly present, the synthesizing unit 294 cuts out the image in the region of the nearby subject located closer to the center, or the region less affected by image distortion.

In FIG. 1, the display unit 42 includes a plane display device such as a liquid crystal display or organic EL device. Under the control of the display control unit 25, the display unit 42 displays a menu for selecting functions to be installed in the imaging apparatus 10, the state of settings of the imaging apparatus 10, a taken image, or an image being reproduced.

The recording medium 43 is a semiconductor memory card or a disc-shaped recording medium that performs recording or reproduction using magnetism or light. The recording medium 43 records encoded data generated by the codec unit 26 etc.

The operation unit 51 is connected to the system control unit 50. The operation unit 51 includes operation switches and operation buttons disposed on the imaging apparatus 10, a touch panel disposed on the display screen of the display unit 42, etc. and outputs the operation signal according to the user operation to the system control unit 50.

The system control unit 50 includes a CPU (central processing unit), ROM (read only memory), RAM (random access memory), etc. The system control unit 50 reads a program recorded in the ROM, executes the program using the CPU, and controls the operation of each component so that the imaging apparatus 10 operates as instructed by the user, according to the operation signal. The program is installed in the imaging apparatus 10 in advance, but it may be provided through installation via a network such as the Internet etc. instead. Alternatively, the program may be provided through various recording media such as a memory card, optical disc, magnetic disc, etc.

<2. Operation of Imaging Apparatus Including Image Processing Device>

Figure 5:
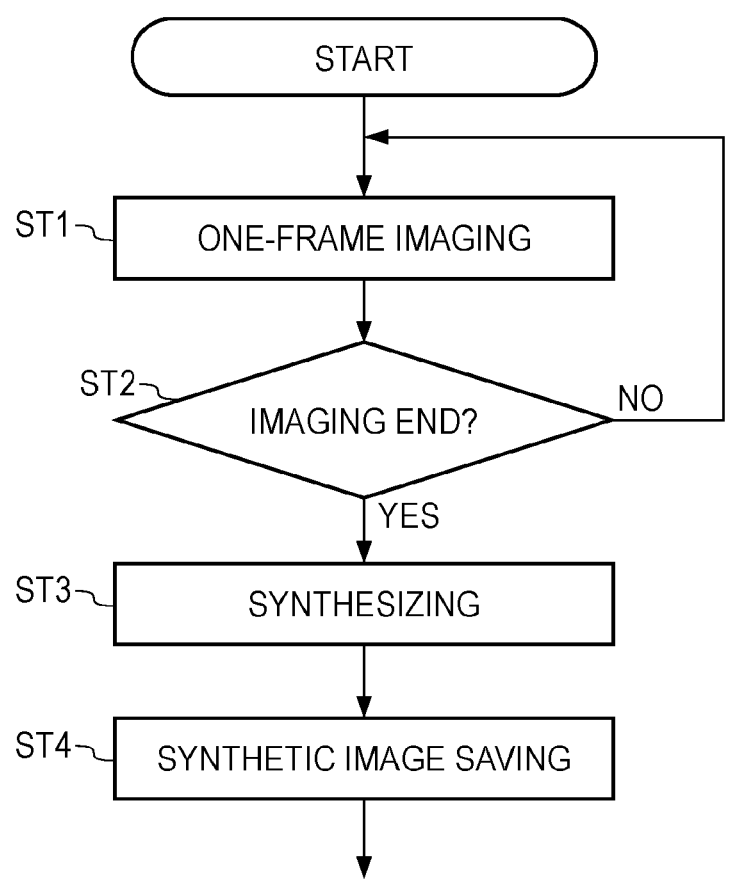
FIG. 5 is a flowchart showing the panoramic imaging operation of the imaging apparatus.

FIG. 5 is a flowchart showing the panoramic imaging operation using the imaging apparatus including an imaging processing device in an embodiment of the present technology. In step ST1, the imaging apparatus 10 performs one-frame imaging. The imaging apparatus 10 performs one-frame imaging operation to generate the image data of one frame of taken image. In addition, the imaging apparatus 10 calculates the distance to the subject in the taken image using the subject distance measurement unit 28 to generate subject distance information. The imaging apparatus 10 stores the image data of the taken image and the subject information in, for example, the memory unit 41 and the processing proceeds to step ST2.

Figure 6:
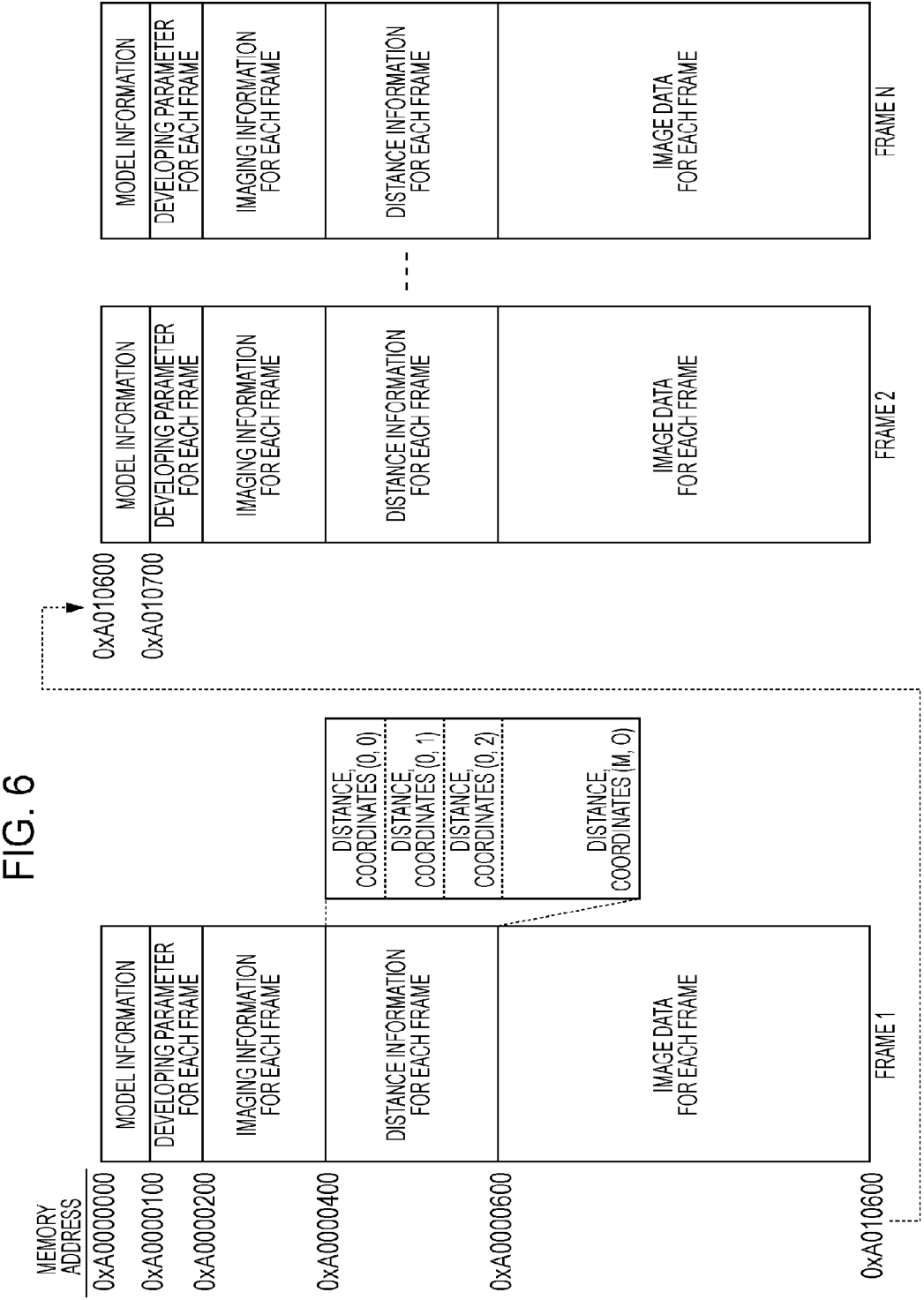
FIG. 6 shows an example of storing a taken image.

FIG. 6 shows an example of storing a taken image and subject distance information in the memory unit 41. The image data for each frame is stored with its subject distance information. The image data for each frame is associated with its imaging information and developing parameter. Subject distance information can be used to identify, for example, the distances from a plurality of coordinate positions set on a frame image to the subject.

Figures 7A, 7B:
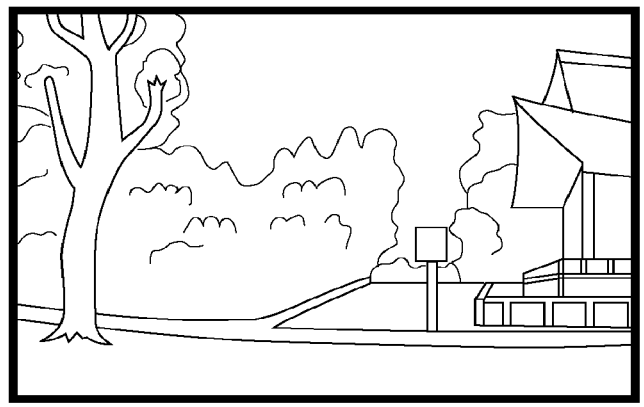
FIGS. 7A and 7B illustrate a taken image and its subject distance information.

FIG. 7A shows a taken image; FIG. 7B shows the subject distance information of the taken image in FIG. 7A. The subject distance information indicates distance values from a plurality of coordinate positions set on the taken image to the subject. The subject distance information has a smaller value when the distance to the subject is smaller or has a larger value when the distance to the subject is larger. For example, in FIG. 7B, this value is 10 when the coordinate position is on the ground on the nearest side in the taken image and this value is 99 when the coordinate position is in the sky in the taken image.

The imaging information in FIG. 6 includes camera settings such as the shooting date and time, exposure control value, and zoom ratio and lens information. Developing parameters include a white balance value and γ value used to develop RAW data.

In FIG. 5, the imaging apparatus 10 determines whether imaging is completed in step ST2. When the imaging apparatus 10 continues imaging operation, the processing returns to step ST1; when the imaging apparatus 10 finishes imaging operation, the processing returns to step ST3. The imaging apparatus 10 continues imaging until imaging end processing is performed and finishes imaging when imaging end processing is performed. The imaging apparatus 10 may determine the end of imaging when, for example, a predetermined number of frames of taken image are generated or swing operation or parallel movement operation for generating a panoramic image by the imaging apparatus 10 is completed.

The imaging apparatus 10 performs synthesizing in step ST3. The imaging apparatus 10 creates a synthetic image with a wider angle of view by cutting out images from a plurality of taken images stored in the memory unit 41 and combining them, and the processing proceeds to step ST4. The imaging apparatus 10 also controls the synthesis of images to create a high quality synthetic image, based on subject distance information.

Figure 8:
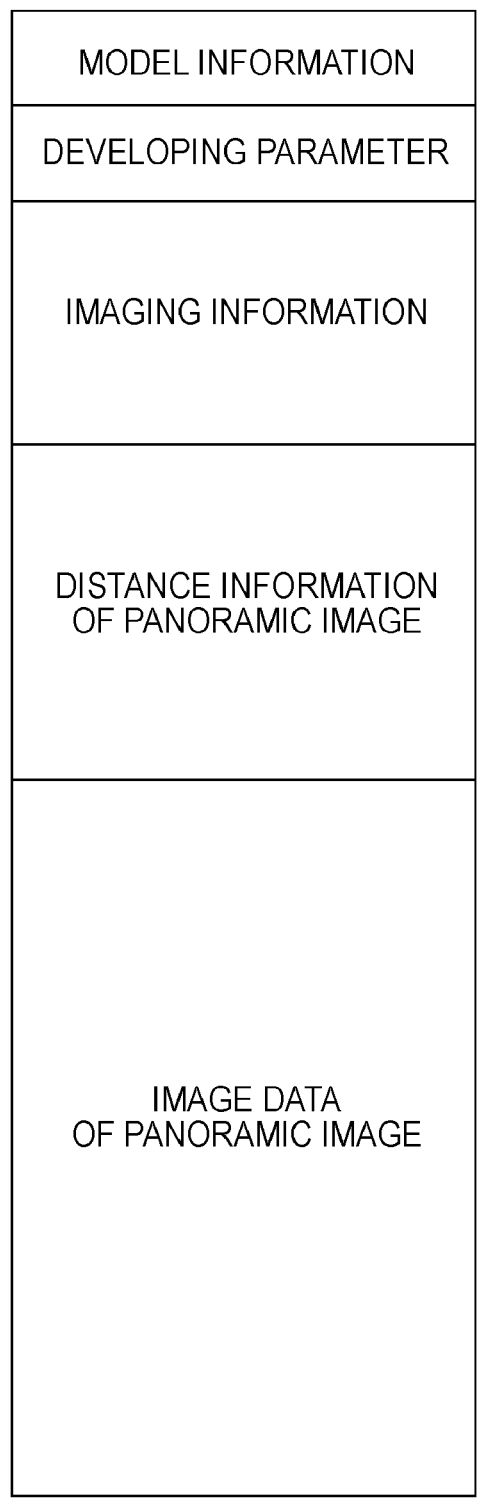
FIG. 8 shows an example of storing a synthetic image.

In step ST4, the imaging apparatus 10 stores the synthetic image. The imaging apparatus 10 stores the synthetic image by recording the image data of the created synthetic image in the memory unit 41 or the recording medium 43. For example, the imaging apparatus 10 associates the image data of the synthetic image with the subject distance information, imaging information, developing parameter, model information, etc. in the synthetic image and stores them, as shown in FIG. 8.

FIG. 9 is a flowchart showing synthesizing. In step ST11, the image synthesizing unit 29 of the imaging apparatus 10 obtains the image data and subject distance information. The image synthesizing unit 29 obtains image data to be combined and the subject distance information associated with the image data from the image data and subject distance information stored in the memory unit 41 and the processing proceeds to step ST12.

In step ST12, the image synthesizing unit 29 detects motion vectors. The image synthesizing unit 29 detects motion vectors between consecutive images based on the subject distance information of the consecutive images. For example, the image synthesizing unit 29 detects the correlation between the subject distance information of the end region in the direction of movement of the imaging apparatus in a taken image with an earlier time stamp and the subject distance information of a taken image with a later time stamp and the position at which the correlation becomes highest, and detects motion vectors. When motion vectors between images are obtained on the basis of subject distance information, if the amount of subject distance information is small, the motion vectors are not obtained at a high accuracy. Accordingly, the image synthesizing unit 29 may perform first detection for a motion vector between images based on subject distance information, may set a search range based on a result of the first detection, and may perform second detection for the motion vector using image data in the search range. That is, the image synthesizing unit 29 detects motion vectors coarsely based on subject distance information and then detects image data in the search range in detail by setting the search range based on the results detected coarsely. If motion vectors are detected in this way, the motion vectors can be detected easily as compared with the case of using only image data. In addition, the motion vectors can be detected at a high accuracy as compared with the case of using only subject distance information.

In step ST13, the image synthesizing unit 29 performs enlargement/reduction processing. The image synthesizing unit 29 estimates the duplicate region in taken images based on subject distance information and enlarges or reduces the images based on the difference in subject distance information in the estimated duplicate region. For example, a subject with small subject distance information is closely located and has a large image size; a subject with large subject distance information is distantly located and has a small image size. When the same subject has different distance information, the image size of the subject is assumed to be different. Accordingly, the image synthesizing unit 29 performs enlargement/reduction processing to match the image sizes of the same subject in consecutive images and the processing proceeds to step ST14. The subject distance information and image size depend on the zoom ratio of the imaging lens unit 11 etc. Accordingly, when the image is enlarged or reduced according to the difference of subject distance information, it is sufficient to determine the enlargement and reduction ratios based on camera settings and lens information included in imaging information.

In step ST14, the image synthesizing unit 29 determines the subject region. The image synthesizing unit 29 determines the region of the nearby subject in a taken image based on subject distance information. For example, it is assumed that the subject distance information value of a nearby subject is large and the subject distance information value of a distant subject is small. In this case, the image synthesizing unit 29 assumes the region whose subject distance information value is less than a preset threshold to be the region of a nearby subject and the processing proceeds to step ST15. The difference in subject distance information is large in the seam between a nearby subject and a distant subject in a taken image. Accordingly, the region of a nearby subject may be determined using the difference with surrounding subject distance information. In addition, subject detection results by image processing as well as subject distance information may be used to detect the desired nearby subject. For example, a nearby person can be surely detected by performing facial recognition of an image in the region of a nearby subject detected on the basis of subject distance information. If the person faces rearward, his or her face is not recognized, but whether the person is a nearby subject or not can be determined based on the subject distance information.

In step ST15, the image synthesizing unit 29 determines whether the nearby subject is included. When the image synthesizing unit 29 determines that the nearby subject is included, the processing proceeds to step ST16. Otherwise, the processing proceeds to step ST17.

In step ST16, the image synthesizing unit 29 cuts out the image without dividing the region of the nearby subject. The image synthesizing unit 29 determines the cut position and cut width (size corresponding to the longitudinal direction of a synthetic image) so that the region of the nearby subject detected in step ST14 is not divided by cutting out of the image and images become consecutive at the seam during synthesizing of the image. If the detected movement vector is used, the cut position and cut width can be easily determined so that the images become consecutive at the seam during synthesizing of the image. The image synthesizing unit 29 cuts out the images used for synthesizing from the taken image and the processing proceeds to step ST18. The image synthesizing unit 29 determines whether the region of the nearby subject is redundantly present in more than one taken image based on subject distance information. When the region is redundantly present, the image is cut out from the taken image in which the region of the nearby subject is located closer to the center. Accordingly, the image is cut out from the region of the nearby subject less affected by image distortion. Whether the region of the nearby subject is redundantly present is determined based on the results of detection of the correlation of the subject distance information corresponding to the region of the nearby subject. For example, when the regions of the nearby subjects match each other, the correlation of the subject distance information corresponding to the regions of the nearby subjects becomes high. Accordingly, whether the region of the nearby subject is redundantly present can be determined on the basis of the correlation of the nearby subject information. The correlation may be detected in the same way as in a motion vector described later.

In step ST17, the image synthesizing unit 29 cuts out the image at the center. The image synthesizing unit 29 cuts out an image used for synthesizing from the center, which is less affected by distortion caused by the imaging lens unit 11 etc and the processing proceeds to step ST18. The image synthesizing unit 29 also determines the cut position and cut width so that images at the seam becomes consecutive when images are combined.

In step ST18, the image synthesizing unit 29 synthesizes images. The image synthesizing unit 29 synthesizes images cut out in step ST16 or step ST17 by adjusting the position based on a motion vector detected in step ST12 so that images at the seam becomes consecutive and the processing proceeds to step ST19.

In step ST19, the image synthesizing unit 29 associates the subject distance information with the synthetic image. The image synthesizing unit 29 associates the subject distance information corrected based on enlargement or reduction of images with the synthetic image and the processing proceeds to step ST20. Since images are cut out or synthesized on the basis of motion vectors in image synthesis, it is considered that the intervals of distance measurement points in a synthetic image become short at the seam. Accordingly, the subject distance information corresponding to distance measurement points with the same intervals is calculated by linear interpolation etc. and the subject distance information may be associated with the synthesis image. The process in step ST19 may be performed after the synthesizing in step ST20 is determined to be completed. Alternatively, only the creation of a synthetic image may be performed without the process in step ST19 being performed.

In step ST20, the image synthesizing unit 29 determines whether the last image has been synthesized. When an image that is not used by the above processes is left, the processing returns to step ST1. When the above processes are completed using all images, the image synthesizing unit 29 finishes synthesizing.

FIGS. 10A and 10B illustrate the generation of a synthetic image. FIG. 10A shows a plurality of taken images P1 to P5; FIG. 10B shows a synthetic image.

The image synthesizing unit 29 obtains the image data and subject distance information of taken images to perform subject region detection processing. It is assumed that, for example, the regions of subjects OB1 and OB2 are detected in the taken image P1, the regions of subjects OB2 and OB3 are detected in the taken image P2, and the region of subject OB3 is detected in the taken image P3 as the regions of nearby subjects in subject region detection processing.

The image synthesizing unit 29 detects motion vectors and performs enlargement/reduction processing. The detection of motion vectors and enlargement/reduction processing will be described later with reference to FIGS. 11A to 11C.

When a nearby subject is included, the image synthesizing unit 29 cuts out an image to be used for synthesizing by determining the cut position and cut width so that the region of a nearby subject is not divided and the image in the region of a nearby subject is not present on the seam after synthesizing. The image synthesizing unit 29 determines whether the region of a nearby subject is redundantly present on taken images based on subject distance information. When the region of a nearby subject is redundantly present on taken images, the image synthesizing unit 29 cuts out the image in the region of the nearby subject located closer to the center. It is assumed that the subjects OB1 and OB2 are detected as nearby subjects in the taken image P1, the subjects OB2 and OB3 are detected as nearby subjects in the taken image P2, and the subject OB3 is detected as a nearby subject in the taken image P3. It is also assumed that the subject OB2 is redundantly present in the taken images P1 and P2 and the subject OB3 is redundantly present in the taken images P2 and P3. In addition, it is also assumed that the image having the subject OB2 disposed at its center is the taken image P2 and the image having the subject OB3 disposed at its center is the taken image P3. In this case, the image synthesizing unit 29 cuts out the image in the region of the nearby subject from the taken image located closer to the center in the direction in which the images are combined.

That is, the image synthesizing unit 29 cuts out the image of the subject OB2 included in the taken image P1 from the taken image P2 or later and sets a cutout region AR1 to prevent the region of the subject OB1 in the taken image P1 from being divided. The image synthesizing unit 29 also cuts out the image of the subject OB3 included in the taken image P2 from the taken image P3 or later and sets a cutout region AR2 to prevent the region of the subject OB2 in the taken image P2 from being divided.

The image synthesizing unit 29 creates a synthetic image by combining the images in the cutout regions AR1 and AR2 through image synthesis.

The subject OB3 is redundantly present in the taken images P3 and P4 and the image having the subject OB3 closer to the center in the direction in which the images are combined is the taken image P3. Accordingly, the image synthesizing unit 29 performs a cut by setting a cutout region AR3 so that the region of the subject OB3 included in the taken image P3 is not divided. In addition, the image synthesizing unit 29 creates a synthetic image with a wide angle of view by combining the image in the cutout region AR3 with the synthetic image through image synthesis.

A synthetic image PG as shown in FIG. 10B with a wide angle of view can be created by repeating the same processing until the last taken image is reached. Images are cut out in such a manner that one image switches to another one at the seam in FIG. 10A, but they may be cut out in such a manner that parts of adjacent images overlap each other at the seam.

FIGS. 11A to 11C show motion vectors and enlargement/reduction processing. FIG. 11A shows two consecutive images (for example, the taken image P1 and the taken image P2) used for the calculation of a motion vector and enlargement/reduction processing. FIG. 11B shows the subject distance information of the taken image P1 and the taken image P2.

When, for example, detecting the motion vector between the taken image P1 and the taken image P2, the image synthesizing unit 29 detects the correlation between the subject distance information of an end side region DLa in the direction in which the imaging apparatus moves in the taken image P1 with an earlier time stamp and the subject distance information of the taken image P2 with a later time stamp to obtain the position at which the correlation becomes the highest. If the correlation in a region DLb in the subject distance information of the taken image P2 becomes the highest, a motion vector MV between the taken image P1 and the taken image P2 can be easily obtained as shown in FIG. 11C from the end side region DLa and the region DLb. If a search range is set with respect to the region DLb and the correlation between an image in the end side region DLa and an image in the search range is detected, the motion vector can be detected at a high accuracy even when subject distance information is not much because measured points are few.

The image synthesizing unit 29 estimates the duplicate region in taken images based on subject distance information and enlarges or reduces the images based on the difference in subject distance information in the estimated duplicate area. For example, the image synthesizing unit 29 detects the correlation of subject distance information and determines the region with a high correlation to be a duplicate region. As described above, a motion vector is detected by detecting the correlation with subject distance and obtaining the position with the highest correlation. Since the duplicate region in taken images is detected to detect a motion vector, it is sufficient to enlarge or reduce the image according to the difference in subject distance information in the detected duplicate region. That is, the image is enlarged or reduced according to the difference between the subject distance information of the end side region DLa in the taken image P1 and the subject distance information of the region DLb in the taken image P2. In FIG. 11B, the values of the subject distance information of the region DLb is smaller than the values of the subject distance information of the end side region DLa. Accordingly, the taken image P2 is determined to have been taken in a position closer to the subject than the taken image P1 and the taken image P2 is reduced. The reduction ratio is determined on the basis of camera settings and lens information. If enlargement/reduction processing is performed in this way on the basis of subject distance information, continuity at the seam can be ensured even when a plurality of images are taken while the imaging apparatus is held and moved in the direction away from the subject and swung, and then the taken images are combined.

If an image is cut out and synthesized on the basis of a movement vector, the synthetic image may not be rectangular as shown in FIG. 11C when the movement vector slants against the longitudinal direction of the synthetic image. Accordingly, the image synthesizing unit 29 performs trimming of the synthetic image to form a rectangular image and stores the trimmed image PH as a synthetic image.

A series of processes described this specification can be executed by hardware, software, or the composite structure of both. When the processes are executed by software, a program that records the process sequence is installed in the memory of a computer built into a dedicated hardware and then executed. Alternatively, the program may be installed in a general-purpose computer that can execute the processes and may be executed.

For example, the program can be recorded in a recording medium such as a hard disk or ROM (read only memory) in advance. Alternatively, the program can be temporarily or permanently stored (recorded) in a removal recording medium such as a flexible disc, CD-ROM (compact disc read only memory), MO (magneto optical) disc, DVD (digital versatile disc), magnetic disc, semiconductor memory card, etc. This type of removal recording medium can be proved as so-called package software.

The program may be transferred to the computer by wireless or wired connections via a network such as a LAN (local area network) or the Internet in addition to being installed in the computer from a removal recording medium. The computer can receive the program transferred in this way and install it in a built-in recording medium such as a hard disk etc.

When a series of processes are executed by hardware, software, or the composite structure of both, the image data of a taken image and the subject distance information corresponding to the taken image may be read from the recording medium or may be obtained from another device via a network. In addition, the image data and subject distance information may be obtained from another device via a network and a synthetic image may be created by an imaging apparatus.

According to an embodiment of the present technology, a nearby subject is cut out for image synthesis without being divided. Accordingly, a high-quality synthetic image with a wide angle of view can be easily created without selecting an image to be overwritten or overwriting the seam with the selected image. When a nearby subject is included in a plurality of taken images or no nearby subject is included, a high-quality synthetic image can be created since an image can be cut out from a part, which is less affected by image distortion. Furthermore, the sizes of the same subject become identical because enlargement/reduction processing is performed according to the difference in the subject distance information of the duplicate part. Accordingly, the continuity at the seam can be ensured even if the distance to the subject changes between taken images during imaging. In addition, subject distance information can be used to easily detect a motion vector.

The present technology should not be limited to the above embodiment. For example, images are cut out in a rectangular shape in the above embodiment, but they may be cut out according to the shape of a nearby subject. Images that were cut out can be enlarged or reduced to ensure the continuity at the seam. The embodiment of the present technology discloses an example of the present technology, so those skilled in the art can modify or replace the embodiment without departing from the scope of the technology. Accordingly, the substance of the present technology should be judged according to the embodiment of the present technology.

The embodiment of the present technology may also be configured as shown below.

(1) An image synthesizing apparatus including:
a subject region determination unit that determines the region of a nearby subject for each of taken images based on subject distance information of a plurality of points generated by distance measurement made during imaging; and
an image synthesizing unit that creates a synthetic image by cutting out an image from each of the taken images based on a position of the region of the nearby subject and combining the cut image for each of the taken images.

(2) The image synthesizing apparatus according to (1), wherein the image synthesizing unit cuts out an image without dividing the region of the nearby subject.

(3) The image synthesizing apparatus according to (1) or (2), wherein the image synthesizing unit cuts out an image at the center for a region other than the region of the nearby subject.

(4) The image synthesizing unit according to any one of (1) to (3), wherein the image synthesizing unit determines whether the region of the nearby subject is redundantly present in taken images based on the subject distance information and, when the region of the nearby subject is redundantly present, the image synthesizing unit cuts out the image in the region of the nearby subject from a taken image in which the region of the nearby subject is closest to the center of the taken image, the taken image being one of the taken images.

(5) The image synthesizing apparatus according to any one of (1) to (4), wherein the image synthesizing unit cuts out the image in the region of the nearby subject from a taken image in which the region of the nearby subject is closest to the center of the taken image in a direction of combination.

(6) The image synthesizing apparatus according to any one of (1) to (5), wherein the image synthesizing unit determines whether the region of the nearby subject is redundantly present in taken images based on the correlation of subject distance information corresponding to the determined region of the nearby subject.

(7) The image synthesizing apparatus according to any one of embodiments (1) to (6), further including an enlargement/reduction unit that estimates a duplicate region in taken images based on the subject distance information and enlarges or reduces images according to difference in the subject distance information in the estimated duplicate region, wherein the image synthesizing unit combines the images enlarged or reduced according to the difference in the subject distance information.

(8) The image synthesizing apparatus according to (7), wherein the enlargement/reduction unit estimates the duplicate region in taken images based on the correlation of the subject distance information.

(9) The image synthesizing apparatus according to any one of (1) to (8), further including a motion vector detecting unit that detects a motion vector between two consecutive taken images based on the subject distance information, wherein the image synthesizing unit creates the synthetic image based on the detected motion vector.

(10) The image synthesizing apparatus according to (9), wherein the motion vector detecting unit performs first detection for a motion vector between taken images based on the subject distance information, sets a search range based on the result of the first detection, and performs second detection for the motion vector using image data in the search range.

(11) The image synthesizing apparatus according to any one of embodiments (1) to (10), wherein the subject region determination unit makes comparison between a preset threshold and the subject distance information and determines the region of the nearby subject based on the result of the comparison.

The present disclosure contains subject matter related to that disclosed in Japanese Priority Patent Application JP 2011-054033 filed in the Japan Patent Office on Mar. 11, 2011, the entire contents of which are hereby incorporated by reference.

What is claimed is:

1. An imaging apparatus, comprising:
   an imaging device configured to generate taken images; and
   circuitry configured to:
   determine a region of a nearby subject in each of the taken images based on subject distance information of a plurality of points within each of the taken images,
   cut out each of the taken images based on a position of the region of the nearby subject to obtain a cut image, and
   stitch in sequence each of the cut images to generate a synthetic image.

2. The imaging apparatus according to claim 1, wherein the circuitry is further configured to generate distance information by distance measurement made during imaging.

3. The imaging apparatus according to claim 2, wherein the imaging device comprises a solid-state imaging device including pixels for detecting a focal point by pupil division of subject light to generate the distance information.

4. The imaging apparatus according to claim 2, further comprising a range sensor.

5. The imaging apparatus according to claim 4, wherein the range sensor is configured to use infrared light.

6. The imaging apparatus according to claim 4, wherein the range sensor is configured to use silent sound.

7. The imaging apparatus according to claim 1, wherein the circuitry is further configured to cut out an image without dividing the region of the nearby subject.

8. The imaging apparatus according to claim 1, wherein the circuitry is further configured to cut out an image at the center for a region other than the region of the nearby subject.

9. The imaging apparatus according to claim 1, wherein the circuitry is further configured to determine whether the region of the nearby subject is redundantly present in taken images based on the subject distance information and, when the region of the nearby subject is redundantly present, and to cut out the image in the region of the nearby subject from a taken image in which the region of the nearby subject is closest to the center of the taken image, the taken image being one of the taken images.

10. The imaging apparatus according to claim 6, wherein the circuitry is further configured to cut out the image in the region of the nearby subject from a taken image in which the region of the nearby subject is closest to the center of the taken image in a direction of combination.

11. The imaging apparatus according to claim 6, wherein the circuitry is further configured to determine whether the region of the nearby subject is redundantly present in taken images based on the correlation of subject distance information corresponding to the determined region of the nearby subject.

12. The imaging apparatus according to claim 1, wherein the circuitry is further configured to estimate a duplicate region in taken images based on the subject distance information, to enlarge or reduce the taken images according to a difference in the subject distance information in the estimated duplicate region, and to create the synthetic image using the taken images enlarged or reduced according to the difference in the subject distance information.

13. The imaging apparatus according to claim 9, wherein the circuitry is further configured to estimate the duplicate region in taken images based on correlation of the subject distance information.

14. The imaging apparatus according to claim 1, wherein the circuitry is further configured to detect a motion vector between two consecutive taken images based on the subject distance information and to create the synthetic image based on the detected motion vector.

15. The imaging apparatus according to claim 11, wherein the circuitry is further configured to perform first detection for a motion vector between taken images based on the subject distance information, to set a search range based on the result of the first detection, and to perform second detection for the motion vector using image data in the search range.

16. The imaging apparatus according to claim 1, wherein the circuitry is further configured to make a comparison between a preset threshold and the subject distance information and to determine the region of the nearby subject based on the result of the comparison.

17. The imaging apparatus according to claim 1, wherein the circuitry is further configured to perform facial recognition of an image in the region of the nearby subject.

18. A method, comprising:
   generating, by a processor, taken images;
   determining, by the processor, a region of a nearby subject in each of the taken images based on subject distance information of a plurality of points within each of the taken images
   cutting out, by the processor, each of the taken images based on a position of the region of the nearby subject to obtain a cut image; and
   stitching, by the processor, in sequence each of the cut images to generate a synthetic image.

19. The method according to claim 18, wherein the image is cut out without dividing the region of the nearby subject.

20. A non-transitory computer-readable medium having instructions encoded thereon which, when executed by at least one processor, cause the at least one processor to execute a process for imaging capturing operation, the process comprising:
- generating taken images;
- determining a region of a nearby subject in each of the taken images based on subject distance information of a plurality of points within each of the taken images;
- cutting out each of the taken images based on a position of the region of the nearby subject to obtain a cut image; and
- stitching in sequence each of the cut images to generate a synthetic image.

21. The computer-readable medium according to claim 20, wherein the act of the cutting out the image is performed without dividing the region of the nearby subject.

22. An image processing apparatus, comprising:
circuitry configured to:
- determine a region of a nearby subject in each of a plurality of taken images based on subject distance information of a plurality of points within each of the taken images,
- cut out each of the taken images based on a position of the region of the nearby subject to obtain a cut image, and
- stitch in sequence each of the cut images to generate a synthetic image.

* * * * *